May 18, 1948.    L. A. TROFIMOV    2,441,606
ALTERNATING CURRENT CONTROLLED POWER TRANSMISSION
Filed Dec. 5, 1944    2 Sheets-Sheet 1

INVENTOR.
Lev A. Trofimov
BY Harry P. Canfield
ATTORNEY

May 18, 1948.  L. A. TROFIMOV  2,441,606
ALTERNATING CURRENT CONTROLLED POWER TRANSMISSION
Filed Dec. 5, 1944  2 Sheets-Sheet 2
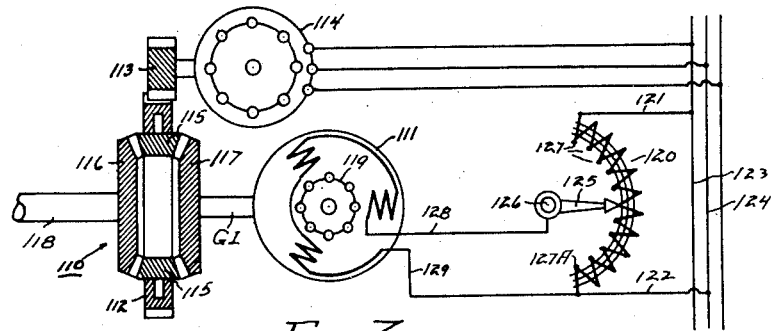
Fig. 3
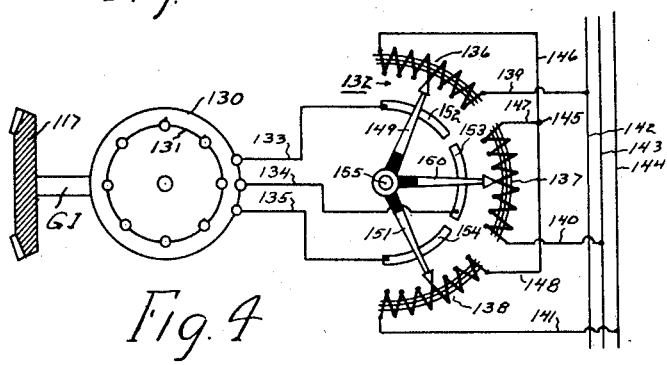
Fig. 4
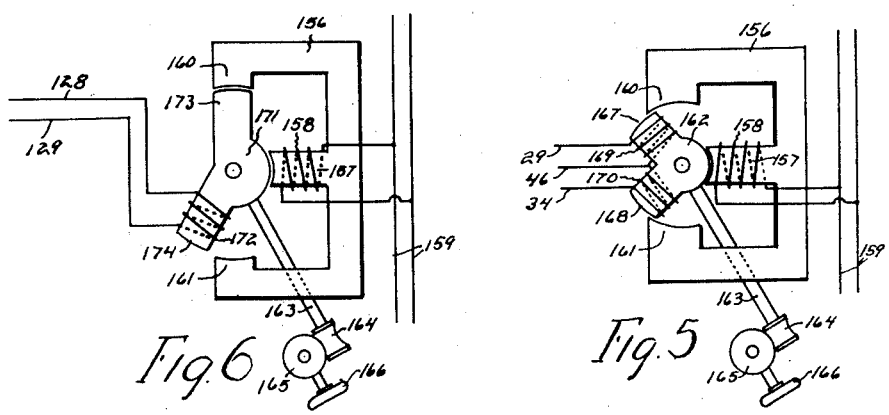
Fig. 6
Fig. 5
INVENTOR.
Lev A. Trofimov
BY Harry P. Canfield
ATTORNEY Patented May 18, 1948

2,441,606

UNITED STATES PATENT OFFICE 2,441,606

ALTERNATING CURRENT CONTROLLED
POWER TRANSMISSION

Lev A. Trofimov, Willoughby, Ohio

Application December 5, 1944, Serial No. 566,745

14 Claims. (Cl. 318—13)

This invention relates to power transmissions of the general class in which the power of a continuously running motor is transmitted to a load, or to a load driving element, to drive it at variable speed, from rest or zero speed to a maximum speed, by controlling the transmission itself as distinguished from controlling the power supplying motor.

The power supplying motor may therefore be any kind of a motor, electric D. C.; or electric A. C.; or internal combustion, etc., etc., with the advantage that the motor can always run at an efficient speed regardless of the speed of the load, or of the load driving element.

The transmission may be constructed in various forms or types, and may be controlled by various means, but the form, or forms of the transmission and particularly the controls thereof to which the present disclosure is directed, comprises, among other things: a differential gearing the pinion carrying spider of which is driven by the power supplying motor; a first and a second differential gear, both meshed with the spider-carried-pinions; the first differential gear being connected to a load driving element; the second differential gear being connected to an alternating current induction generator, the electrical generated load of which is varied by varying the potential applied to its field winding, through the agency of an induction apparatus, or transformer, or the like; and the variations of electrical load exerting a retarding or braking action on the second differential gear and controlling the torque and speed of the load driving element.

A transmission and control of this general type in which a single differential gearing is utilized, is shown and described in my copending application Serial No. 460,511, filed October 2, 1942; and a transmission and control of this general type in which a double differential gearing is utilized is shown and described in my copending application Serial No. 453,810, filed August 6, 1942, now Patent No. 2,365,982; and the subject matter of the present disclosure which illustrates and describes both forms is divisional therefrom respectively, and is also in part a continuation thereof.

It is among the objects of the invention:

To provide generally an improved motor driven power transmission;

To provide an improved power transmission of the differential gearing class, and in which the transmitted or output power is controlled by controlling the electrical load of an alternating current type induction generator driven by the transmission;

To provide an improved transmission of the type referred to above, and in which the electrical generated load of the induction generator is controlled and varied by controlling and varying a winding of the generator through the agency of an induction apparatus, that is, a voltage varying transformer, inductor, or the like, through which alternating current energization of the generator winding is supplied from alternating current mains.

Other objects will be apparent to those skilled in the art to which my invention appertains.

The invention is fully disclosed in the following description taken in connection with the accompanying drawing, in which:

Figs. 3 and 4 are views similar respectively to Figs. 1 and 2, but in which the transmission utilizes a single differential gearing and a single generator;

Fig. 5 is a diagrammatic view of an inductor apparatus which may be substituted, as a modification, for the transformer of Fig. 1;

Fig. 6 is a diagrammatic view of an inductor apparatus which may be substituted, as a modification for the transformer of Fig. 3, and which when employed in triplicate may be substituted for the triplicate transformers of Fig. 4 or of Fig. 2.

Figure 1:
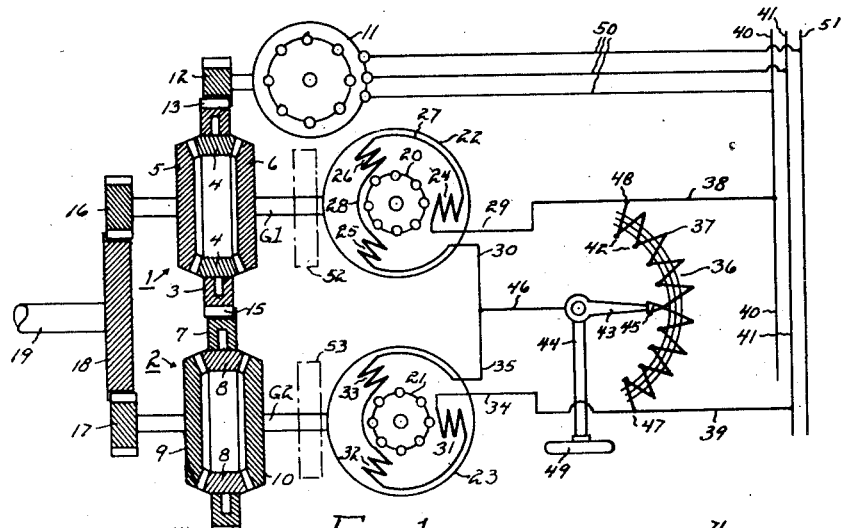
Fig. 1 is a diagrammatic view of an embodiment of the invention, in which the transmission comprises a double differential gearing, and two induction generators, each of which has a single phase winding, energized through a transformer.

Referring to Fig. 1 of the drawing, I have shown at 1 and 2 a pair of differential gearings. The gearing 1 comprises a spider element 3 rotatably supporting pinions 4—4 with which are meshed differential gears 5 and 6. The differential gearing 2 comprises a spider element 7 rotatably supporting pinions 8—8 with which are meshed differential gears 9 and 10.

The bearings for the gears are not shown, the view being diagrammatic, but it will be understood by those skilled in the art that the spider elements and the differential gears are rotatably supported.

A power supplying motor is diagrammatically shown at 11 and it drives a pinion 12 which supplies power to drive both spider elements 3 and 7, and this may conveniently be done by providing gear teeth 13 and 14 respectively on peripheral portions of the spider elements 7 and 3, and by meshing the two spider elements together as at 15; whereby the motor 11 will drive the spider elements in opposite directions of rotation. While it is not essential, it is preferred that the spider elements 3 and 7 have the same number of teeth, and that the differential gears 5, 6, 9, and 10 be alike, and that the pinions 4 and 8 be alike, as to their number of teeth, whereby the double differential gearing as a whole may be referred to as symmetrical.

The differential gears 5 and 9 have drivingly connected thereto, gears or pinions 16 and 17, respectively, both of which are meshed with a gear 18 connected to a power output element or load driving element 19, which, in Fig. 1, is shown diagrammatically as a power output shaft.

The differential gears 6 and 10 are respectively connected to shafts G1 and G2 which, respectively, drive the rotors 20 and 21 of induction generators indicated generally at 22 and 23.

While the construction of the generators 22 and 23 may be varied in the practice of the invention, I prefer to employ induction generators having the general construction of alternating current squirrel cage motors, and in such case the rotors 20 and 21 would be squirrel cage rotors. The stators of the generators 22 and 23 having such construction comprise windings, which, when they are of motor construction and used as motors, are generally three phase windings; but in the embodiment of Fig. 1, it is contemplated that each of the generators 22 and 23 shall have its stator windings energized with single phase alternating current, and to this end the stator winding of the generator 22 has the three parts 24, 25, and 26 thereof reconnected to dispose them in series, the windings 24 and 26 being connected together by a wire 27, the windings 25 and 26 by a wire 28, and the windings 24 and 25 having external wires 29 and 30 connected thereto.

By a similar arrangement, the windings 31, 32, and 33 of the generator 23 are connected in series and have external wires 34 and 35 connected thereto.

In the practice of the invention it is contemplated that the windings of the generators 22 and 23 will be energized respectively with single phase alternating current, and that the energization of both may be made equal, and that of one may be made greater than that of the other, and to this end, the following means is provided.

An autotransformer shown generally at 36 has its winding 37 connected at its ends by wires 38 and 39 across alternating current supply mains 40 and 41. The winding 37 of the transformer is provided with a plurality of external tap connection points 42—42. An arm 43 is mounted on a shaft 44 to rotate with the shaft around its axis, and at its free end carries a contact 45 engageable with the tap points 42—42 as it rotates. A wire 46 connects the arm 43 with both wires 30 and 35. The wire 34 is connected to one end of the transformer winding at 47 and the wire 29 is connected to the other end of the transformer winding at 48.

By this arrangement it will be apparent that when the contact 45 is on the midpoint of the autotransformer, potential will be supplied by the wires 34, 35, and 46 to the winding of the generator 23, and by wires 29, 30, and 46 to the winding of the generator 22, and that these potentials will be equal; and that when the arm 43 is rotated by its shaft 44 to other tap points of the transformer, the potential applied to one generator winding will be greater than that supplied to the other. To rotate the arm 43, the shaft 44 may for convenience be provided with a handle 49.

The power supply motor 11 may be any kind of a motor as has been referred to, but in the showing of Fig. 1 and for convenience it is an alternating current induction motor connected by wires 50 to a three phase alternating current supply main, of which the said wires 40 and 41 may be two of the three mains, and a wire 51 may be the third main.

A line switch not shown may be provided as will be understood to connect the mains 40, 41, and 51 to a source of three phase alternating current, but this has been omitted for simplicity, so that in Fig. 1, the motor 11 may be considered as energized and continuously running; and as is well known, the motor 11 being a squirrel cage induction motor in this instance, will run at approximately constant speed with some slight and negligible variation depending upon the power output which it delivers to the pinion 12.

The operation of the apparatus of Fig. 1 will now be described, it being assumed that the arm 43 is at the start on the midtap of the transformer 36.

With the spider elements 3 and 7 driven in opposite directions by the motor 11, the pinions 4—4 will supply equal torques at all times to their associated gears 5 and 6, tending to drive them in the same direction as the spider 3; and the pinions 8—8 of the spider 7 will likewise supply equal torques to the differential gears 9 and 10 tending to drive them in the same direction as the spider 7.

Torque is thus transmitted to the differential gears 6 and 10 causing them to drive the rotors 20 and 21 of the generators 22 and 23 and when the stators of these generators are equally energized as described, the torques developed at the gears 6 and 10 will be equal and in opposite directions. Accordingly, the torques developed at the differential gears 5 and 9 will be equal to the torques at the gears 6 and 10 and therefore equal to each other, and in opposite directions; and these equal and opposite torques are transmitted to the gears 16 and 17, but the latter both being meshed with the gear 18 on the output shaft 19, and being in opposite directions, the gears 16 and 17 and the differential gears 5 and 9 are prevented from rotating so that the load shaft 19 remains at rest as a consequence of equal energization of the generators 22 and 23.

As to the electrical loads of the generators 22 and 23, it is known that if the stator of an induction motor be energized with alternating current, and the rotor thereof be rotated at a sufficiently high speed within the field produced by the stator energization, alternating current will be developed in the stator winding, and will flow out therefrom back to the alternating current supply mains, so that the conductors supplying energizing potential from the mains to the stator winding become also the conductors over which the electrical output load of the generator is supplied back to the supply mains.

According to the accepted theory of induction generators, this is possible only when there are conditions which cause the current in the mains connected to the stator to have two components, one leading the other by a phase angle, one of the components being the exciting component. The exciting current, according to accepted theory, may be lagging current, as from a synchronous generator, or leading current delivered to synchronous motors, synchronous converters, or synchronous condensers, connected to the network into which the induction generator delivers its output.

I have found it to be a fact that if an induction motor be connected to commercial alternating current supply mains, through a transformer, and driven above synchronous speed, it will act as a generator and supply current back to the supply mains through the transformer; regardless of the power factor of its supply mains; and I have concluded that the presence of the inductive transformer sets up the two necessary phase-displaced current components.

It will be observed that this principle is utilized in Fig. 1; and that when the arm 43 is on the mid-tap of this transformer, the two electrical loads of the generators 22 and 23 will be equal, and that torque supplied to the gears 6 and 10 to drive them will be equal, and as a consequence the torques developed at the gears 5 and 9 will be equal, and in opposite directions, and the output shaft 19 will remain at rest.

With the output shaft at rest as referred to, if the arm 43 be turned by rotating the handle 49 to move the contact 45 to some other tap point of the transformer, say in the clockwise direction as viewed in the drawing, the electrical load developed by the generator 22 will become greater and that developed by the generator 23 will become smaller, due to the greater stator energization of one and the lesser stator energization of the other, and as a consequence the equal torques at the gears 6 and 5 will become greater than the equal torques at the gears 10 and 9, and the gear 6 will slow down due to the increased load of the generator 22 connected to it and the gear 5 will speed up; and the gear 16 will supply greater torque to the gear 18 than does the gear 17, and the output shaft 19 will be rotated in a corresponding direction. Similarly, by moving the arm 43 in the other direction and causing the load of the generator 23 to be greater than that of the generator 22, the load shaft 19 will be caused to rotate in the other direction. The speed of the load shaft 19 in rotating will be commensurable with the degree to which the two loads of the generators are unbalanced.

As mentioned above, it may be convenient in starting up the apparatus to put the arm 43 on the mid-point of the transformer to energize both generators 22 and 23 equally. The motor 11 obviously will be of sufficient horsepower size to supply adequate power to the output shaft 19 and also to the generators, so that with the generators equally energized the rotors of the generators are compelled to come up to a speed higher than the synchronous speed which they would attain if these units 22 and 23 were operating as motors, and are compelled to act as generators, so that any tendency of these units to act as motors because of the connection of their stators to the alternating current supply mains, is completely obliterated by the overpowering action of the motor 11.

It would be possible of course as is well understood by those skilled in the art to bring the rotors 20 and 21 of the generators up to full speed in starting up the apparatus before the stator windings were energized at all, and that this could be accomplished by suitable contactors, but it has been found that it is unnecessary.

It may be further noted that with a double differential gearing of the type illustrated in Fig. 1, when the gears 6 and 10 are rotating at the same speeds they will have a certain arithmetical sum of revolutions per minute; and this arithmetical sum remains a constant as one gear is slowed down by increased electrical load and the other correspondingly speeds up.

Figure 1A:
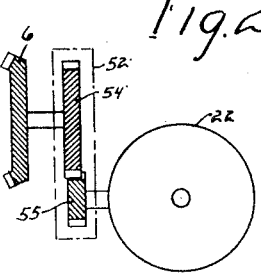
Fig. 1A is a fragmentary view of a part of Fig. 1 illustrating additional gears which in some cases may be desirable.

In order that the rotors of the generators, for example the rotor 20 of the generator 22, shall always be driven at a speed high enough to cause it to act as a generator, it is only necessary that it will have such a speed when its generator is given the maximum electrical load and is rotating at its minimum speed. This of course would be determined by gear ratios in the gearing for a given speed of the motor 11, and if it should be desirable or necessary to this end, a step-up gear ratio would be provided in the line of the shafts G1 and G2, for example in the place indicated by the rectangles 52 and 53 by which the rotors of the generators would always be driven faster than their driving gears 6 and 10. A modification of this kind is shown in Fig. 1A, where gears 54 and 55 in the rectangle 52 are illustrated.

From the foregoing it will be seen that if the hand wheel 49 is rotated to dispose the arm 43 at the midposition on the transformer, the load shaft or power output shaft 19 will remain at rest, and that upon rotating the hand wheel 49 in one direction, the load shaft will rotate in a corresponding direction, and upon rotating it in the opposite direction the load shaft will come to rest and then rotate in the opposite direction; and that the speed of the load shaft will correspond to the angular extent of rotation of the hand wheel 49 from its mid-point, the power input motor 11 rotating at all times at full or high efficiency speed.

Figure 2:
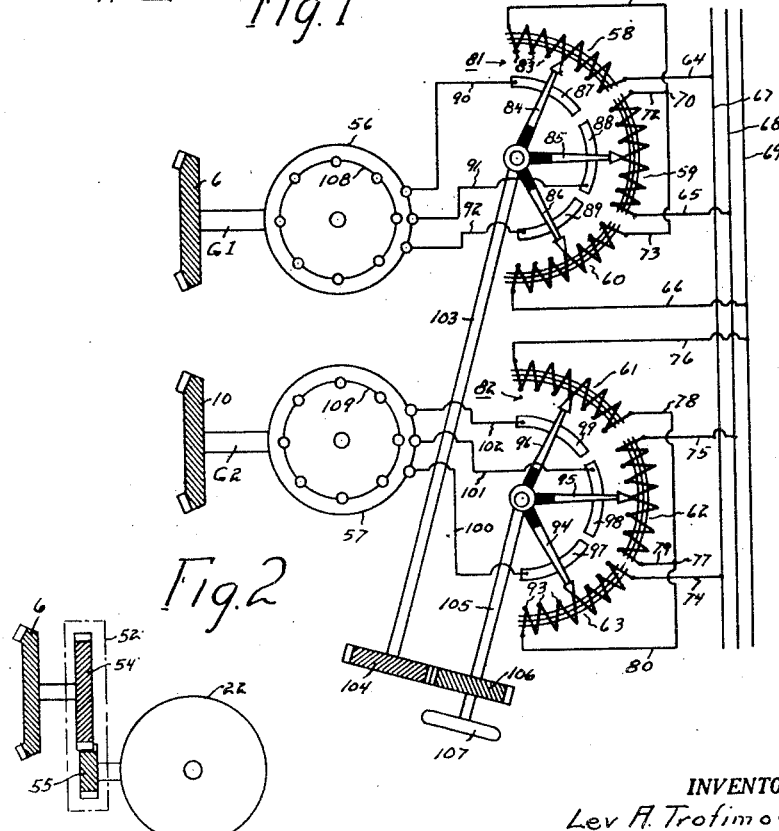
Fig. 2 is a view similar to Fig. 1, but with parts omitted for simplicity and in which the induction generators have three phase windings.

The form of Fig. 2 may be considered as a modification of the form of Fig. 1. The differential gears 6 and 10 and the shafts G1 and G2 have been shown as in Fig. 1 to identify this form with the form of Fig. 1, and it is therefore believed unnecessary to illustrate in this figure the rest of the differential gearing.

In this form, generators 56 and 57 are shown, driven by the shafts G1 and G2, and as indicated diagrammatically these generators may have the construction of three phase squirrel cage motors having three phase stators. There are three autotransformers 58, 59 and 60 for energizing the three phases of the stator of the generator 56, and three autotransformers 61, 62, and 63 for energizing the three phase stator circuit of the generator 57.

The windings of the transformers 58, 59, and 60 are connected at one end by wires 64, 65, and 66 respectively to the mains 67, 68, and 69 of a three phase alternating current supply system, and the other ends thereof are connected to a common point 70 by wires 71, 72, and 73.

The windings of the transformers 61, 62, and 63 are connected at one end by wires 74, 75, and 76 to the respective wires of the three phase system, and their other ends are connected to a common point 77 by wires 78, 79, and 80.

As will therefore be apparent there is shown generally at 81 and 82 a pair of three phase autotransformers.

Each of the windings of the transformer 81 has tap connections 83—83, over which concurrently move, three contact arms 84, 85, and 86; and the arms also make continuous contact with arcuate contacts 87, 88, and 89 which are respectively connected by wires 90, 91, and 92 with the stator of the generator 56.

The transformer 82 has a similar arrangement of taps 93—93, arms 94, 95, and 96, and arcuate contacts 97, 98, and 99, for energizing the stator of the generator 57 over wires 100, 101, and 102.

The three arms of the transformer 81 are connected by a shaft 103 to a gear 104, and the three arms of the transformer 82 are connected by a shaft 105 to a gear 106 meshed with the gear 104, and one or the other of the gears, for example the gear 106, may be rotated by a hand wheel 107.

In view of the more complete description of the form of Fig. 1, it is believed to be apparent that when each of the contact arms is on the midpoint of its associated autotransformer winding, the stators of the generators 56 and 57 will be equally energized with three phase alternating current, producing a rotary field therein of intermediate or given strength, and that when the hand wheel 107 is rotated in one direction or the other, the potential supplied to the stator winding of one generator will be increased and that of the other decreased concurrently; and when the stator windings are equally energized, the electrical load or braking drag on the gears 6 and 10 will be equal, and when one is energized more strongly than the other the braking drag of that one will be decreased over that of the other for the purposes described; and that to produce this generator action it is only necessary that the rotors 108 and 109 of the generators be driven above the speeds at which the magnetic fields of their stators rotate, and while this in general will be true when the gears 6 and 10 are driven as described for Fig. 1, it may be assured by stepping up the speed of the generator rotors as indicated in Fig. 1A and as described for Fig. 1.

It is also believed to be apparent that the energizing wires 90, 91, and 92; and 100, 101, and 102; of the two generators by which they are energized from the supply mains 67, 68, and 69, are also the wires over which the electrical load output of the generators is supplied back to the same mains.

The operation of Fig. 2, therefore, will be the same as that of Fig. 1; and as to construction, it is the same as that of Fig. 1 except that the stators of the generators are three phase stators and as a consequence are each supplied by a three phase transformer.

In Fig. 3 is illustrated a modification in which only one differential gearing, shown generally at 110, is utilized, together with only one induction generator 111, this form otherwise being generally similar to Fig. 1. The spider 112 of the differential gearing is rotatably driven by a pinion 113 on the shaft of the motor 114. The pinions 115—115 rotatably supported by the spider 112 are meshed with differential gears 116 and 117, the gear 116 being connected to the output shaft 118, and the gear 117 being connected by a shaft G1 to the rotor 119 of the generator 111.

The stator windings of the generator 111 are connected in series as was described for the form of Fig. 1, and an autotransformer 120 is energized by wires 121 and 122 across alternating current mains 123 and 124. An arm 125, rotatable about a pivot center or axis or shaft 126, moves over tap connection points 127, etc., of the transformer winding. The wires 128 and 129 connected to the stator winding are connected respectively to the arm 125 and to one end of the transformer winding.

With this arrangement when the arm 125 is rotated clockwise to the last tap connection point, 127A, there will be no potential on the stator supply wires 128—129, and as the arm is moved counterclockwise over the tap connections greater and greater potential is applied to these wires to energize the stator winding more and more strongly.

For convenience, in considering this form, the arm 125 may be considered as first in its most clockwise position, with the stator of the generator unenergized, and with the motor 114 running at full speed. If there be any considerable load connected to the output shaft 118, the rotor 119 of the generator will therefore rotate idly, and without generating any electrical load, and it will run at twice the speed of the spider 112 and the shaft 118 will remain at rest. As the arm 125 is moved counterclockwise over the tap points 127, energizing the field of the generator, torque will develop at the gear 117, and an equal torque at the gear 116, since the torque at the spider 112 at all times divides equally between the gears through the pinions 115, and the shaft 118 will rotate.

The output shaft 118 therefore may have its speed controlled by rotation of the arm 125.

If the load on the output shaft 118 is an overhauling load, for example if it be connected to the winding drum of a hoist with a load thereon, then the load will be moving at maximum when the winding of the generator 111 is unenergized; and as the winding is energized more and more, it will cause the gear 117 to slow down, and the gear 116 and the load shaft 118 will slow down, that is to say, its overhauling speed will become less, and ultimately, at a certain field strength, will come to rest. By further increasing the energization of the generator field, the load shaft 118 will begin to rotate in the reverse direction and at increasing speed as the generator stator is energized more strongly, and correspondingly will raise the hoist load.

Thus speeds of the output shaft 118 for non-overhauling loads will have a range from zero or rest speed up to a maximum speed; and for overhauling loads will have a range of speed from a maximum speed in one direction, to zero or at rest speed, and to a maximum speed in the other direction.

In Fig. 4 is illustrated a form which may be considered as a modification of Fig. 3 and it is identified therewith by reproducing the gear 117 and the shaft G1. The generator, here 130, is of the squirrel cage construction having a rotor 131 rotating in a three phase field provided by windings energized from or through an autotransformer 132, by wires 133, 134, and 135; the transformer 132, comprising three individual transformers 136, 137, and 138. One end of the winding of each of the individual transformers is connected by wires 139, 140, and 141 to the respective mains 142, 143, and 144 of a three phase supply system, and the other ends of the windings are connected to a common point 145 by wires 146, 147, and 148.

Contact arms 149, 150, and 151 move over tap connection points on the individual windings of the transformer and make constant contact with arcuate contacts 152, 153, and 154 to which the wires 133, 134, and 135 are respectively connected.

By concurrently rotating the arms 149, 150, and 151 by any suitable means, for example by rotating a shaft 155 to which they are all connected, the strength of the energization of the stator of the generator 130 may be varied from zero to a maximum for the purposes described; and it is believed that the operation will otherwise be understood from the more complete description of the preceeding forms particularly that of Fig. 3.

In the forms of Figs. 1 to 4, the varying of the energization of the generator stator, whether single phase or three phase, is effected by a contact rotatably moving over tap connections of an autotransformer arrangement.

The variations in speed of the output shaft therefore will occur in small steps. In some cases, it may be desirable to make the variation gradual or continuous or without steps. Also, in some cases, for example when the apparatus or the control part thereof is installed in an explosive atmosphere, it may be desirable to eliminate all possibility of electric arcs or sparks which might ignite such atmosphere. By using the induction type of generator all sparks are eliminated thereat (which would not be the case if direct current generators having commutators were used), and to make the apparatus and its control completely spark-proof, the tendency to arc or spark at the taps of the autotransformers would have to be eliminated.

For all of these end results, which may in some cases be wanted, the arrangements shown diagrammatically in Figs. 5 and 6 are provided by which the variation of the voltage applied to the generator stators may be effected inductively.

These devices of Figs. 5 and 6 are here referred to as inductors, but as a matter of technical principle they are in effect transformers, the significance of which will presently be explained.

Referring to Fig. 5, there is shown at 156, an E-shaped core which may be of laminated steel the central core portion 157 of which has thereon a winding 158 energized across alternating current supply mains 159. Between the polar portions 160 and 161 is a rotary or bridging element 162, supported to rotate and be rotated in alternate directions in any suitable manner, for example by being mounted upon a shaft 163 and rotatable by a worm 164 engaged with a worm gear 165 on the shaft, the worm being rotatable by a hand wheel 166. The worm and gear engagement holds the rotary element 162 in positions to which it is rotated by the hand wheel 166 and prevents it from moving from such positions by magnetic attraction of the polar portions 160 and 161.

The rotary element 162 has two legs 167 and 168 disposed at an angle to each other, such that the rotary element 162 may have a rotated position in which neither leg 167 or 168 is fully aligned with the polar portions 160 and 161, and other positions in which one or the other of the legs is more nearly aligned with one of the polar positions. The angle illustrated is approximately 90° but this particular angle is not essential. Windings 169 and 170 are provided on the legs 167 and 168 respectively, and the inner ends of the windings are connected to a common wire 46 and the outer ends are connected to wires 29 and 34.

Magnetic flux produced by the winding 158 flows to both polar portions 160 and 161, and when the rotary element 162 is in the mid-position illustrated it induces a low potential in the windings 169 and 170, and that induced between the wires 46—29 by the winding 169 is equal to that induced between the wires 46—34 by the winding 170.

Upon rotating the rotary element 162, say, clockwise, to more nearly align the leg 167 with the polar portion 160 and move the leg 168 still further out of alignment with the polar portion 161, the potential across wires 29—46 rises and that across the wires 34—36 falls.

If the wires 29, 46, and 34 of Fig. 5 were substituted for the same wires in Fig. 1, then upon rotation of the hand wheel 166 of Fig. 5 to different positions, the apparatus of Fig. 1 would operate the same as it does, and as described, upon rotating the hand wheel 49 of Fig. 1.

In Fig. 6 is illustrated diagrammatically another form of inductor, the construction of which is similar to that of Fig. 5 as indicated by the same reference characters for some of the parts; but the rotary element, here 171 has a winding on only one of the two legs 173 and 174, namely, a winding 172 on the leg 174, connected to wires 128 and 129. In the position of the rotary element 171 illustrated; little or no potential is induced in the winding 172, most of the flux from the winding 158 flowing to the polar portion 160; and upon rotating the rotary element 171 counterclockwise by the hand wheel 166, more and more flux flows to the polar portion 161 and more and more potential is induced in the wires 128 and 129.

If the wires 128 and 129 of Fig. 6 be substituted for the same wires in Fig. 3, and the shaft 163 of Fig. 6 be turned by its hand wheel 166, the apparatus of Fig. 3 would then operate the same as was described for it upon turning its shaft 126.

In the forms of Figs. 2 and 4, each of the induction generators has a three phase field energized from three phase mains through three autotransformers, all three transformers being adjustable by a common rotary shaft. It is believed that it will now be apparent, without further expanding the specification and drawing hereof, that three such inductors as shown in Fig. 6, each energized from a different phase of a three phase supply system, and each supplying current to one of the phases of the generator stator winding of Fig. 4, and all adjustable by a common shaft, would produce the same variable field energization of the generator 130 of Fig. 4 as described as does the transformer arrangement of Fig. 4. This substitution would comprise substituting in Fig. 4, three of the Fig. 6 inductors for the three autotransformers of Fig. 4; and that it will also be apparent that two sets of three of the Fig. 6 inductors could in a like manner be substituted for the two sets of three autotransformers of Fig. 2; and that when such substitution is made, the forms of Figs. 4 and 2 will operate the same with the Fig. 6 inductors as they do with their described autotransformers.

As was stated above, when so-called transformers are utilized, as in Figs. 1 to 4, the current load of the induction generators is supplied back therefrom over the wires which energize their stators, as is well known; and that this current load by transformer action is supplied through the transformers to the supply mains. When the so-called inductors of Fig. 5 or Fig. 6 are utilized the same action occurs inasmuch as those inductors are transformers in electromagnetic induction principle.

Autotransformers have been illustrated and described but it is believed that it will be understood that transformers of the type having separate primary and secondary windings with tap connections on the secondary may be substituted.

Hand wheels are illustrated and described for changing the output potentials of the transformers and inductors, but this will be understood as not essential; and that any other means may be substituted, including automatic means responding to some quantity or factor which is to be controlled or regulated by the output shaft of the transmission.

As to the differential gearings, for example those of Fig. 1, it effects simplification to have the spider elements 3 and 7 rotate in opposite directions, and to have the gears 5—6 rotate in opposite directions with respect to the gears 9—10, but this is not essential. Any arrangement, which may in some cases include motion reversing gears between the generators of Fig. 1 and the differential gearings or between the gears 16 and 17 of Fig. 1 and the differential gearings, may be utilized, although it is desirable to have such gear arrangements apply torques in opposite directions to the output shaft when at rest, as described.

Because of the identity or similarity of principle of the so-called transformers and so-called inductors of the foregoing, they are both here defined and referred to in the claims as induction potential transformers.

From the foregoing it will be seen that numerous changes and modifications may be made in the apparatus as illustrated and described above, and my invention comprehends all such changes and modifications which come within the scope of the appended claims which define the invention.

I claim:

1. In a power transmission, a differential gearing comprising three elements namely: a spider element rotatably driven by a motor, and rotatably supporting a pinion, and two differential gears both meshed with the pinion; one differential gear being drivingly connected to a power output element; the other differential gear being drivingly connected to the rotor of an induction generator having the construction of a three phase squirrel cage motor with its three phase stator windings connected in series; a source of alternating potential; an induction potential transforming device energized from the source and supplying transformed single phase potential to the series stator windings, and provided with means for adjustably varying the transformed potential.

2. In a power transmission, a differential gearing comprising three rotatable elements, namely: a spider element rotatably supporting a pinion and two differential gears meshed with the pinion; one of said three elements being driven by a motor; another of said elements being drivingly connected to a power output element; and the third of said elements being drivingly connected to the rotor of an induction generator having the construction of a three phase squirrel cage motor with its three phase stator windings connected in series; a source of alternating potential; an induction potential transforming device energized from the source and supplying transformed single phase potential to the series stator windings, and provided with means for adjustably varying the transformed potential.

3. In a power transmission, two differential gearings each comprising three elements, namely: a spider element rotatably supporting a pinion, and two differential gears meshed with the pinion; a motor driving both spider elements; one differential gear of each gearing being drivingly connected to a power output element; the other differential gear of each gearing being drivingly connected respectively to the rotors of two induction generators each having a stator winding; a source of alternating potential; an induction potential transforming device energized from the source and supplying transformed potential to the stator windings of the generators; and provided with means for adjustably variably increasing the potential supplied to one winding and concurrently decreasing that supplied to the other, and vice versa.

4. In a power transmission, two differential gearings each comprising three elements, namely: a spider element rotatably supporting a pinion, and two differential gears meshed with the pinion; a motor driving both spider elements; one differential gear of each gearing being drivingly connected to a power output element; the other differential gear of each gearing being drivingly connected respectively to the rotors of two induction generators each having a stator winding; a source of alternating potential; an induction potential transforming device energized from the source and supplying transformed potential to the stator windings of the generators; and provided with means for adjustably varying the transformed potential to cause the potential supplied to both stator windings to be equal and to cause that supplied to one to be greater than that supplied to the other.

5. A power supplying unit comprising: a transmission; a continuously running motor supplying power to the transmission; a power take off from the transmission; an alternating current induction generator having the construction of an induction motor comprising a rotor and a polyphase stator winding, the rotor being driven by the transmission, and the polyphase stator windings being connected in series; the transmission comprising means responsive to variations of energization of the series connected stator windings to vary the power output of the transmission; a source of alternating potential; induction potential-transforming means supplying transformed potential from the source to the series connected windings; and means to adjustably vary the potential supplied by said transforming means.

6. In a power transmission, a differential gearing comprising three elements namely: a spider element rotatably driven by a motor, and rotatably supporting a pinion, and two differential gears both meshed with the pinion; one differential gear being drivingly connected to a power output element; the other differential gear being drivingly connected to the rotor of an induction generator having the construction of a polyphase-stator induction motor with the polyphase stator windings connected in series; a source of alternating potential; an induction potential transforming device energized from the source and supplying transformed single phase potential to the series stator windings; and provided with means for adjustably varying the transformed potential.

7. In a power transmission, a differential gearing comprising three rotatable elements, namely: a spider element rotatably supporting a pinion and two differential gears meshed with the pinion; one of said three elements being driven by a motor; another of said elements being drivingly connected to a power output element; and the third of said elements being drivingly connected to the rotor of an induction generator having the construction of a poly-phase-stator induction motor with the polyphase stator windings connected in series; a source of alternating potential; an induction potential transforming device energized from the source and supplying transformed single phase potential to the series stator windings, and provided with means for adjustably varying the transformed potential.

8. In a power transmission, a differential gearing comprising three elements namely: a spider element rotatably driven by a motor, and rotatably supporting a pinion, and two differential gears both meshed with the pinion; one differential gear being drivingly connected to a power output element; the other differential gear being drivingly connected to the rotor of an induction generator having the construction of a polyphase squirrel cage induction motor with the polyphase stator windings connected in series; a source of alternating potential; an induction potential transforming device energized from the source and supplying transformed single phase potential to the series stator windings, and provided with means for adjustably varying the transformed potential.

9. In a power transmission, a differential gearing comprising three rotatable elements, namely: a spider element rotatably supporting a pinion and two differential gears meshed with the pinion; one of said three elements being driven by a motor; another of said elements being drivingly connected to a power output element; and the third of said elements being drivingly connected to the rotor of an induction generator having the construction of a polyphase squirrel cage induction motor with the polyphase stator windings connected in series; a source of alternating potential; an induction potential transforming device energized from the source and supplying transformed single phase potential to the series stator windings, and provided with means for adjustably varying the transformed potential.

10. In a power transmission, two differential gearings each comprising three elements, namely: a spider element rotatably supporting a pinion, and two differential gears meshed with the pinion; a motor driving one of the elements of both gearings; another element of each gearing being drivingly connected to a power output element; the other element of each gearing being drivingly connected respectively to the rotors of two induction generators each having a stator winding; a source of alternating potential; an induction potential transforming device energized from the source and supplying transformed potential to the stator windings of the generators; and provided with means for adjustably variably increasing the potential supplied to one winding and concurrently decreasing that supplied to the other, and vice versa.

11. In a power transmission, two differential gearings each comprising three elements, namely: a spider element rotatably supporting a pinion; and two differential gears meshed with the pinion; a motor driving one of the elements of both gearings; another element of each gearing being drivingly connected to a power output element; the other element of each gearing being drivingly connected respectively to the rotors of two induction generators each having a stator winding; a source of alternating potential; an induction potential transforming device energized from the source and supplying transformed potential to the stator windings of the generators; and provided with means for adjustably varying the transformed potential to cause the potential supplied to both stator windings to be equal and to cause that supplied to one to be greater than that supplied to the other.

12. In a power transmission, a differential gearing comprising three elements namely: a spider element rotatably driven by a motor, and rotatably supporting a pinion, and two differential gears both meshed with the pinion; one differential gear being drivingly connected to a power output element; the other differential gear being drivingly connected to the rotor of an induction generator having an electrically energizable stator field winding; a source of alternating potential; an induction potential transforming device energized from the source and having a circuit over which it supplies alternating current at transformed potential to energize the stator field winding and over which alternating current generator load is supplied from the stator field winding back to the source when the rotor is driven above synchronous speed of the stator field winding; and means to adjustably vary the transformed potential to vary the generator current load.

13. In a power transmission, a differential gearing comprising three rotatable elements, namely: a spider element rotatably supporting a pinion and two differential gears meshed with the pinion; one of said three elements being driven by a motor; another of said elements being drivingly connected to a power output element; and the third of said elements being drivingly connected to the rotor of an induction generator having an electrically energizable stator field winding; a source of alternating potential; an induction potential transforming device energized from the source and having a circuit over which it supplies alternating current at transformed potential to energize the stator field winding and over which alternating current generator load is supplied from the stator field winding back to the source when the rotor is driven above synchronous speed of the stator field winding; and means to adjustably vary the transformed potential to vary the generator current load.

14. A power supplying unit comprising: a mechanical transmission; a continuously running motor supplying power to the transmission; a power take off from the transmission; an alternating current induction generator having a rotor, and a stator field winding and an exciting circuit for the winding; the rotor being driven by the transmission; a source of alternating potential; induction potential transforming means supplying alternating current at transformed potential from the source over the exciting circuit to energize the stator field winding to cause the generator to develop electrical load in the stator field winding; and the said circuit conducting the generated current load back to the source through the transforming means when the rotor is driven above synchronous speed of the stator field winding; the transmission being responsive to variations of generator load to vary the transmission power output; and means to vary the potential supplied by the transforming means to vary the generator load.

LEV A. TROFIMOV.

REFERENCES CITED

The following references are of record in the file of this patent:

UNITED STATES PATENTS

| Number | Name | Date |
|---|---|---|
| 729,199 | Meyer | May 26, 1903 |
| 1,221,391 | Thullen | Apr. 3, 1917 |
| 1,667,718 | Connell | May 1, 1928 |

FOREIGN PATENTS

| Number | Country | Date |
|---|---|---|
| 558,334 | France | May 23, 1923 |
| 642,766 | France | May 9, 1928 |

OTHER REFERENCES

Lawrence's "Principles of A. C. Machinery," second edition, 1921, pages 497 to 504, McGraw-Hill Book Co., New York.